United States Patent
Jones et al.

(10) Patent No.: US 7,051,108 B1
(45) Date of Patent: May 23, 2006

(54) METHOD AND SYSTEM OF INTERPROCESS COMMUNICATIONS

(75) Inventors: Greg Jones, Raleigh, NC (US); Wei Wendy Wang, Apex, NC (US); Parvathi Rajagopal, Cary, NC (US)

(73) Assignee: EMC Corporation, Hopkinton, MA (US)

( * ) Notice: Subject to any disclaimer, the term of this patent is extended or adjusted under 35 U.S.C. 154(b) by 751 days.

(21) Appl. No.: 09/742,720

(22) Filed: Dec. 21, 2000

(51) Int. Cl.
*G06F 15/16* (2006.01)
*G06F 13/00* (2006.01)

(52) U.S. Cl. ..................................... 709/230; 719/330
(58) Field of Classification Search .............. 709/227, 709/203, 221, 230; 719/310, 312, 313, 328, 719/330
See application file for complete search history.

(56) References Cited

U.S. PATENT DOCUMENTS

| | | | | |
|---|---|---|---|---|
| 5,568,616 A | * | 10/1996 | Narayanaswami | 709/232 |
| 5,619,697 A | * | 4/1997 | Nishida | 719/313 |
| 5,682,534 A | * | 10/1997 | Kapoor et al. | 719/328 |
| 5,774,660 A | * | 6/1998 | Brendel et al. | 709/201 |
| 5,926,636 A | * | 7/1999 | Lam et al. | 719/313 |
| 6,208,952 B1 | * | 3/2001 | Goertzel et al. | 709/230 |
| 6,728,788 B1 | * | 4/2004 | Ainsworth et al. | 719/330 |

* cited by examiner

*Primary Examiner*—David Wiley
*Assistant Examiner*—J. Bret Dennison
(74) *Attorney, Agent, or Firm*—A. Jose Cortina; Daniels Daniels & Vendonik, P.A.; R. Kevin Perkins (57) ABSTRACT

A method and system of interprocess communication bypasses the connection oriented protocol associated with an interprocess communication facility when the client and server are local, and thus the communication oriented protocol is unnecessary. The system determines if a client is local to a server and forms a conventional connection oriented protocol connection between the client and the server. If the client and server are local, connection oriented protocol and its associated overhead are not necessary, and the system sets pointers directly from the server socket to the client socket and from the client socket to the server socket. Thus, data may be transferred directly between client and server sockets without using connection oriented protocol, and a higher throughput is obtained. Alternatively, if the client and server are not local, data is transferred via a conventional connection oriented protocol connection. Therefore, the method and system support both local and remote connections.

10 Claims, 7 Drawing Sheets

METHOD AND SYSTEM OF INTERPROCESS COMMUNICATIONS

FIELD OF THE INVENTION

This invention relates to a system and method of interprocess communications which provides increased data transfer performance by bypassing connection oriented protocol and the associated overhead for local connections.

BACKGROUND OF THE INVENTION

Current approaches to interprocess communications between a client and a server typically involve a software endpoint associated with a connection, i.e., an Interprocess Communications Facility. The invention as described herein specifically identifies the use of sockets as the Interprocess Communications Facility. However, as will be readily appreciated by one of ordinary skill in the art, other Interprocess Communications Facilities may be readily substituted for the socket software endpoint as used herein. For example, the Interprocess Communications Facilities used to implement the invention may include stream sockets, datagram sockets, Berkeley Standard Distribution (BSD) sockets, UNIX-domain sockets, or Transport Layer Interface (TLI) connections. Further, as used herein and as will be readily understood by one of ordinary skill in the art, a "client" is a process or application that is configured to run from a host computer server. Thus, clients and servers open a socket or other comparable Interprocess Communications Facility through which communications may be made.

Typically, a socket forms a connection between a client and a server using connection oriented protocol (COP). Socket connections using connection oriented protocols have the disadvantage of poor performance because of the protocol overhead. Socket connections using connection oriented protocols are generally designed for clients on different systems to communicate with each other over a computer network. The associated protocol overhead increases the central processing unit cycles and computer memory required for every communicated data unit. An example of a typical connection oriented protocol is Transmission Control Protocol/Internet Protocol (TCP/IP).

The overhead associated with connection oriented protocol is necessary for applications run on a network to ensure the accurate transfer of data. However, connection oriented protocol is not necessary to ensure the accuracy of locally transferred data. As described herein, "local" or "on the same system" means that the client and server are both located on the same machine and are not connected by a network connection such that connection oriented protocol is not necessary for the accurate transfer of data.

In a typical local socket connection, the client writes data to a socket connection, and the socket connection copies the data into the server kernel. As will be readily understood by one of ordinary skill in the art, connection oriented protocols, such as TCP/IP, typically break the data into packets. The protocol allocates a buffer for the network header and check sums the data. Headers must be placed on each data packet, and each packet must be queued either onto the network device, or, if the connection is local, to "loopback software." As will be readily understood by one of ordinary skill in the art, "loopback software" is a conventional software which mimics a network device for local data transfers. Thus, clients and servers may transfer data using the same process without regard to whether a connection is local or through a network. Each data packet is then processed, the network header is removed and the header and data sum are checked for accuracy. Then the protocol finds the socket, queues the data, and disconnects.

Connection oriented protocols have the advantage of working either through a network, or on the same system. However, connection oriented protocols have poor performance for data transfer because of the associated overhead discussed above. Furthermore, if a connection is local, the overhead is unnecessary.

One approach to provide higher performance connections for local data transfer is to set pointers directly between socket connections that do not use connection oriented protocol. UNIX-domain sockets are an example of such a configuration. UNIX-domain sockets move data directly between the client socket and the server socket without any protocol overhead. However, each client or application must be individually coded to use sockets so configured, and, as a practical matter, most applications have been coded to use connection oriented protocols over a computer network. In addition, sockets using such a configuration cannot be used over a computer network. Therefore, although UNIX-domain sockets provide significantly better performance for local data transfer when compared to typical connection oriented protocol sockets, unlike connection oriented protocol sockets, UNIX-domain sockets do not provide for data transfer for both local and remote clients.

Thus, it is noted that there is a need for increasing performance for local connections while still providing for network connections. In addition, any increases in performance for local connections should not require the re-coding of existing applications that are configured for connections using connection oriented protocol. These advantages and other advantages are provided by the system and method described herein, and numerous disadvantages of existing techniques are avoided.

SUMMARY OF THE INVENTION

In accordance with one aspect of the invention, there is provided a method for bypassing the connection oriented protocol and the overhead associated therewith for local client to server connections, while allowing a conventional connection oriented protocol socket connections for non-local client to server connections. The method involves forming an socket connection between a server and a client, and detecting whether a client address is local to the server. If the address is local, the pointers are set between the server and client sockets to bypass the connection oriented protocol. The data is then transferred via the connection from the server to the client and from the client to the server. After data transfer, the pointers to the client and server sockets are set to null to disconnect the connection. However, if the client address is not local to the server, a conventional socket connection using the appropriate connection oriented protocol is formed.

An advantage of this approach is that the connection oriented protocol is bypassed for data transfer only when connection oriented protocol is not necessary, namely when the connection is local. However, if the connection is not local, a conventional socket connection is formed. Thus, performance for local connections is greatly improved without having to rewrite applications to use sockets that do not use connection oriented protocol, such as UNIX-domain sockets. In addition, local and network clients are supported by the invention.

Preferably, the method involves detecting errors in connection, and if errors are detected, setting the pointers from the local server and client's socket to null, and allowing the conventional connection using connection oriented protocol to remain for transferring the client and server data.

Yet still further, the method involves synchronizing the client and the server to check for compatibility. Some local clients may not be compatible with the server. In such a case, it may be necessary to connect using conventional connection oriented protocol. For example, some local clients may have sockets of a different type from that used on a server, for example, sockets or TLI connections. If the sockets or comparable Interprocess Communications Facilities are incompatible for a direct connection, connection oriented protocol is necessary for successful data transfer. Therefore, the invention provides for setting the pointers to null and allowing the conventional connection using connection oriented protocol to remain for data transfer when the sockets or comparable Interprocess Communications Facilities are incompatible. However, if the client and the server are compatible, pointers are set at the socket level to allow data transfer bypassing the connection oriented protocol.

In an alternative aspect, the invention relates to an interprocess communications system for bypassing the connection oriented protocol and the overhead associated therewith for local client to server connections, while allowing a conventional connection oriented protocol socket connection for non-local connections. The system includes a server which is configured for communicating with one or more clients through socket connections. The server and the client query whether the connection is remote or local. The server is configured for setting pointers from the client to the server socket and from the server to the client socket when the connection is local. The connection formed by the pointers bypasses the connection oriented protocol, thus allowing more efficient data transfer for local connections.

Preferably, the server detects errors in connection, and the server sets the pointer to null if any errors are detected. Thus, if errors are detected, a conventional connection using connection oriented protocol remains for transferring data between the client and the server.

Yet still further, the server checks the client and the client checks the server for compatibility. Preferably, the server checks whether the client's sockets are of the same type as the server, and the client checks whether the server's sockets are of the same type as the client. If the sockets or comparable Interprocess Communications Facilities are incompatible for direct connection, connection oriented protocol is necessary for successful data transfer. Therefore, if the sockets or comparable Interprocess Communications Facilities are not compatible, the server sets the pointers to null, and thus, the conventional connection using connection oriented protocol remains.

An advantage of this approach is that it allows local clients that are not compatible with the server absent connection oriented protocol to connect using a conventional connection. Thus, compatible and incompatible clients as well as local and remote clients are supported.

DETAILED DISCUSSION

Figure 1:
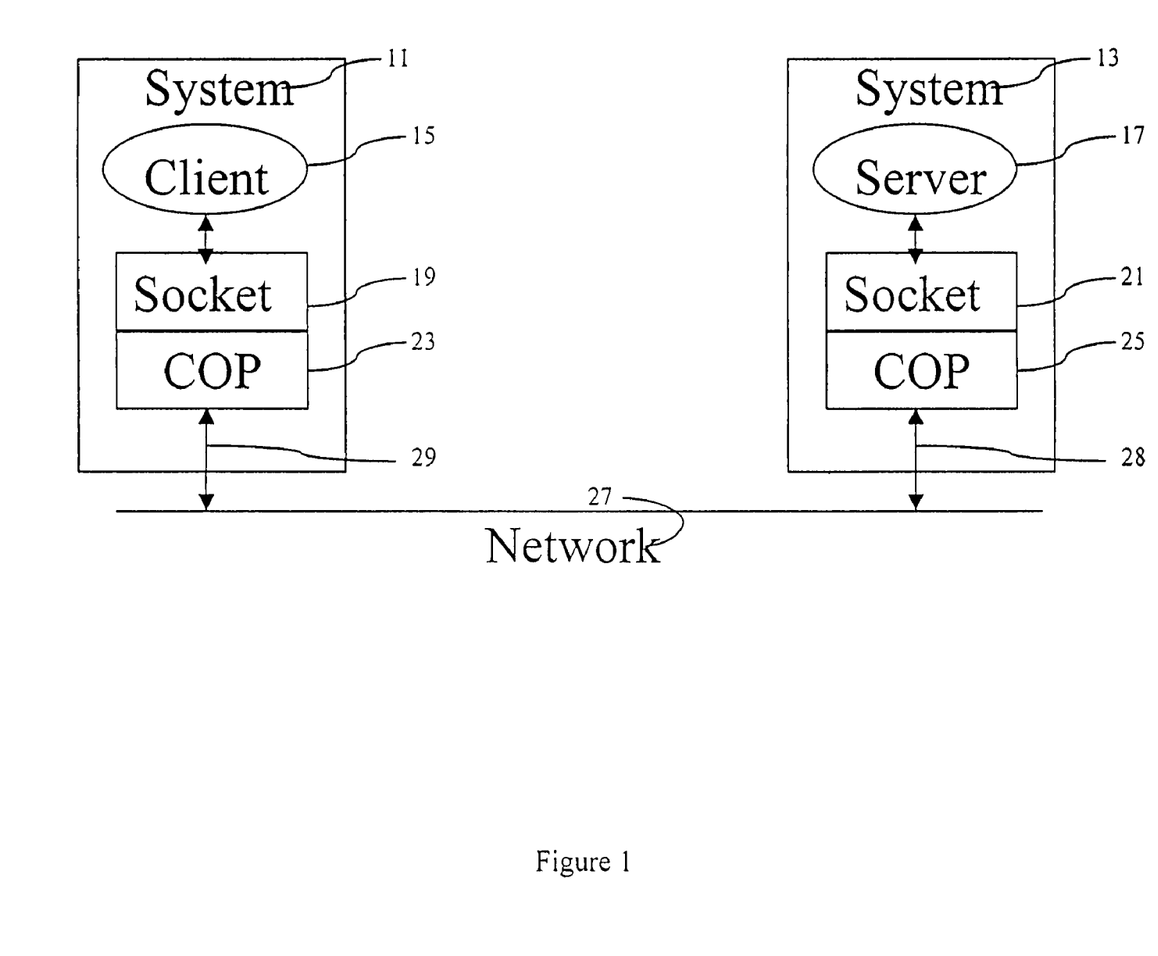
FIG. 1 is an overview diagram of a conventional socket connection on a network using a connection oriented protocol (COP).

Referring to FIG. 1, an overview of conventional socket connection between a client 15 and a server 17 on a network 27 using connection oriented protocol (COP) 23 & 25 is depicted. For clarity and ease of presentation, only two systems 11 and 13 are depicted. As will be readily appreciated by those of ordinary skill in the art, the invention is applicable to multiple clients on a single server or multiple systems on a network having multiple clients and servers.

As shown in FIG. 1, data is transferred between the client 15 and the server 17 through a network 27. As will be readily appreciated by one of ordinary skill in the art, a network application program interface is necessary for the accurate transfer of data between client 15 and server 17 through a network 27. The sockets 19 & 21 are necessary components of the network application protocol interface, and the client 15 and server 17 access the connection oriented protocol 23 & 25 through the sockets 19 & 21. Thus, the client 15 and the server 17 connect to the network 28 & 29 using a conventional socket 19 & 21 connection and connection oriented protocol 23 & 25. The connection oriented protocol is a protocol that processes data in a manner that is necessary for data transfers over a computer network. However, if connection oriented protocol is used for the local transfer of data, the connection oriented protocol processing adds additional unnecessary steps to the transfer of data, which slows down the throughput of the data transfer.

A conventional commonly used connection oriented protocol is Transmission Control Protocol/Internet Protocol (TCP/IP), which uses socket connections. TCP/IP processes data using the following steps. First the sender writes data into its socket, and the TCP/IP associated with the sender breaks data into smaller network size chunks of data called packets. The sender or receiver may be either the client or the server. TCP then allocates a buffer for the network header and checks the sum of the data in each packet for accuracy. Then IP places headers on the packet and queues the packet through the network 27, which processes and transfers the packet. On the receiving side, IP removes the header from the packet, and TCP checks the sum of the data and the header for accuracy. Finally, TCP finds the socket and queues the data on the receiver's socket. The receiver socket can then read the data.

Figure 2:
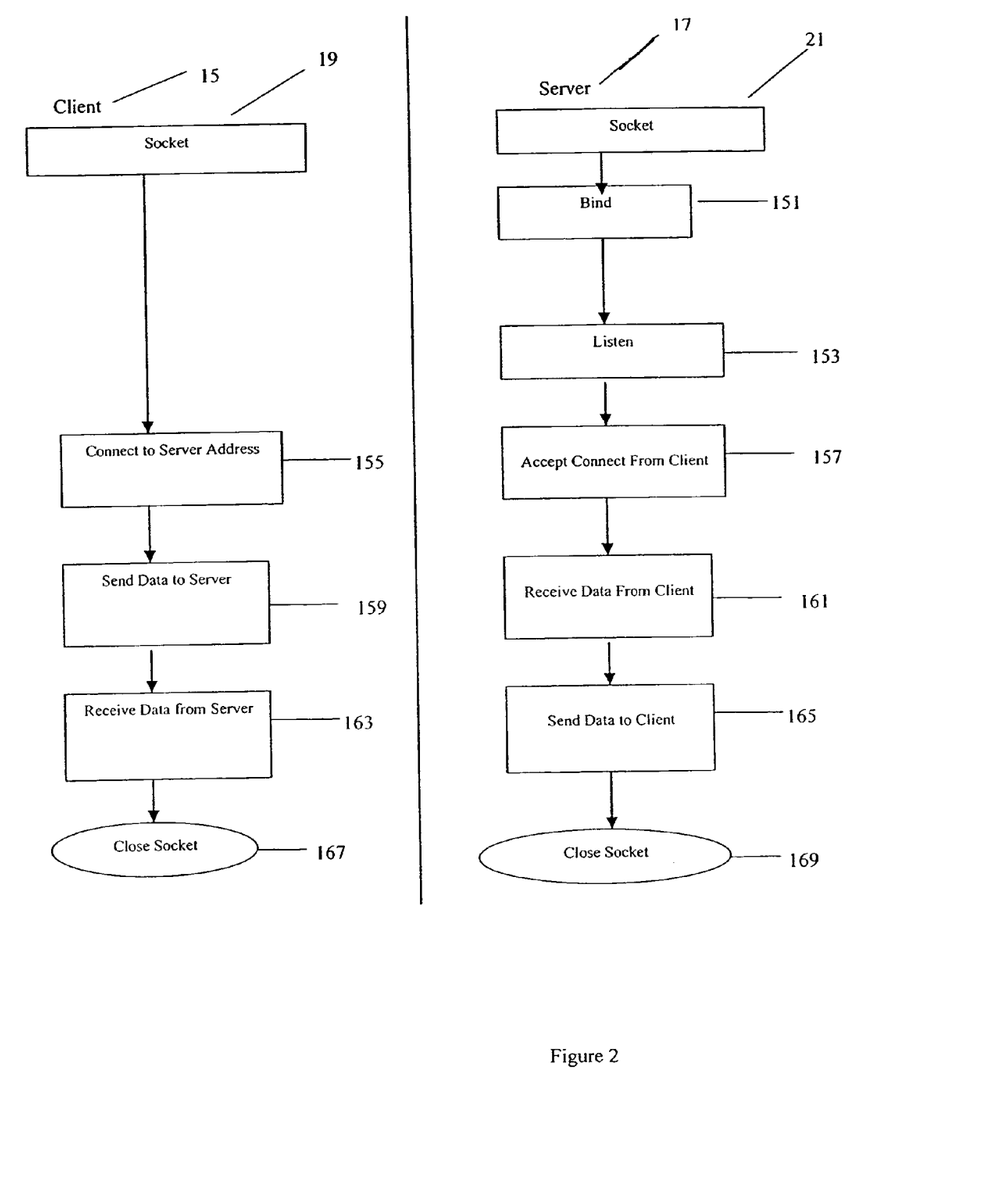
FIG. 2 shows the flow of a conventional connection process.

FIG. 2 shows the flow of a conventional connection process between a client and a server. The client 15 and the server 17 each have sockets 19 & 21. As will be readily appreciated by those of ordinary skill in the art, each client and each server has an Internet Protocol (IP) address operatively associated therewith. The connection oriented protocol binds 151 a high level IP address with the socket 19. The server socket 21 indicates to the system that it is a server socket and is able to accept a connection from a client in the listening 153 step. The client then connects to the server address 155, and the server accepts the connection from the client 157. Once the connection is completed, the client 15 may send data to the server 159 and receive data from the server 163, and the server 17 may receive data from the client 161 and send data to the client 165. The data transferred in steps 159, 161, 163, and 165 is transferred over the computer network 27 via connection oriented protocol 23 & 25, depicted in FIG. 1. After the data has been transferred in steps 159, 161, 163, and 165, the socket connection is closed 167 & 169.

Figure 3:
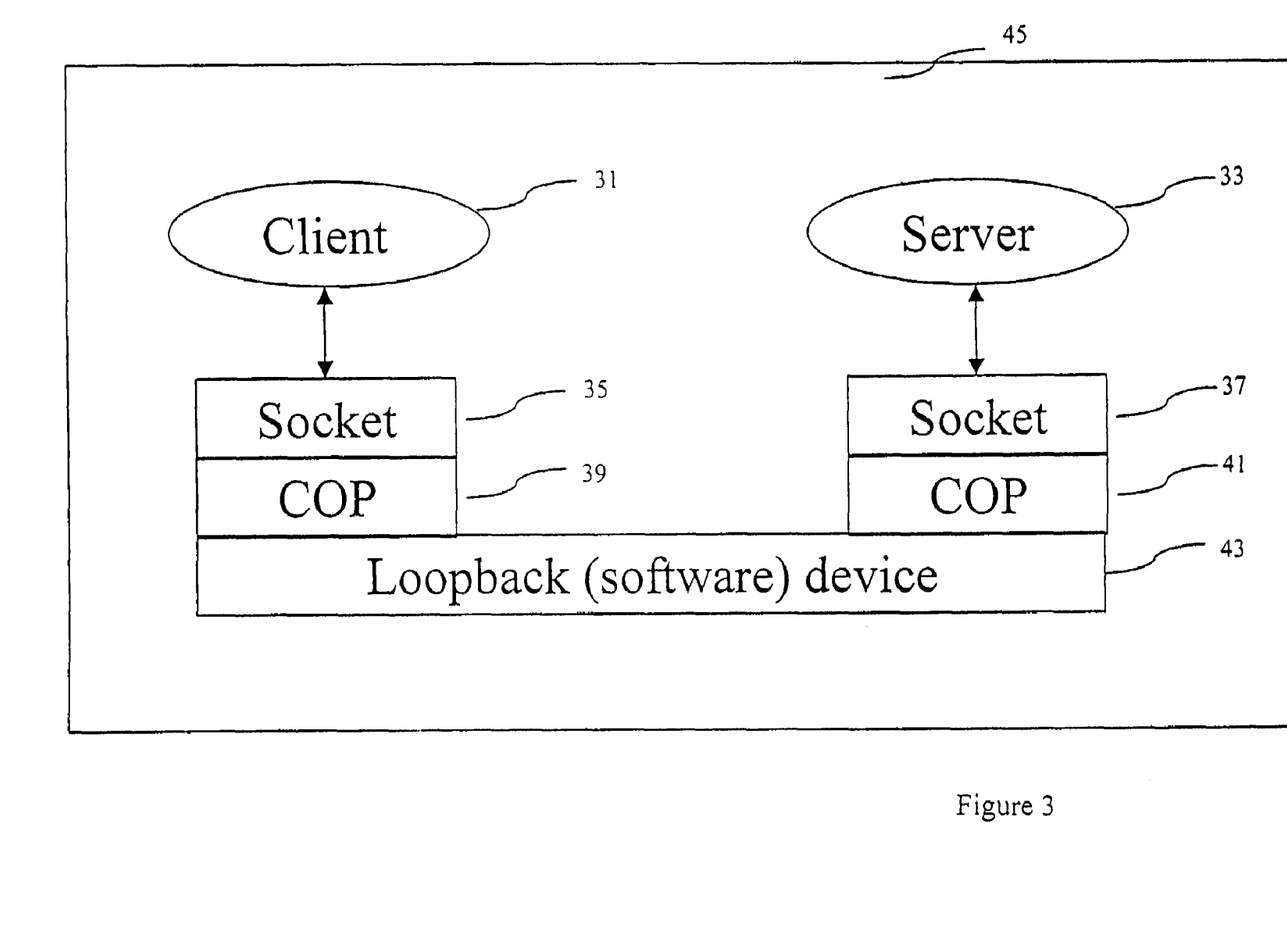
FIG. 3 is an overview diagram of a conventional socket connection on a single system using connection oriented protocol and conventional loopback software.

FIG. 3 depicts the conventional connection relationship between a client 31 and a server 33 on the same system 45. The relationship depicted in FIG. 3 uses the same connection and data transfer procedure shown in FIG. 2 described above. However, as will be readily understood by one of ordinary skill in the art, the data transferred in steps 159, 161, 163, and 165 is transferred via a loopback software device 43. A loopback software device is conventional software that mimics a network device for local data transfers. Therefore, the connection and data transfer steps are the same as if the data were sent over a computer network via connection oriented protocol as depicted in FIG. 1. Thus, a conventional connection relationship between a client 31 and a server 33 on the same system 45 transfers data through connection oriented protocol 39 & 41.

Figure 4:
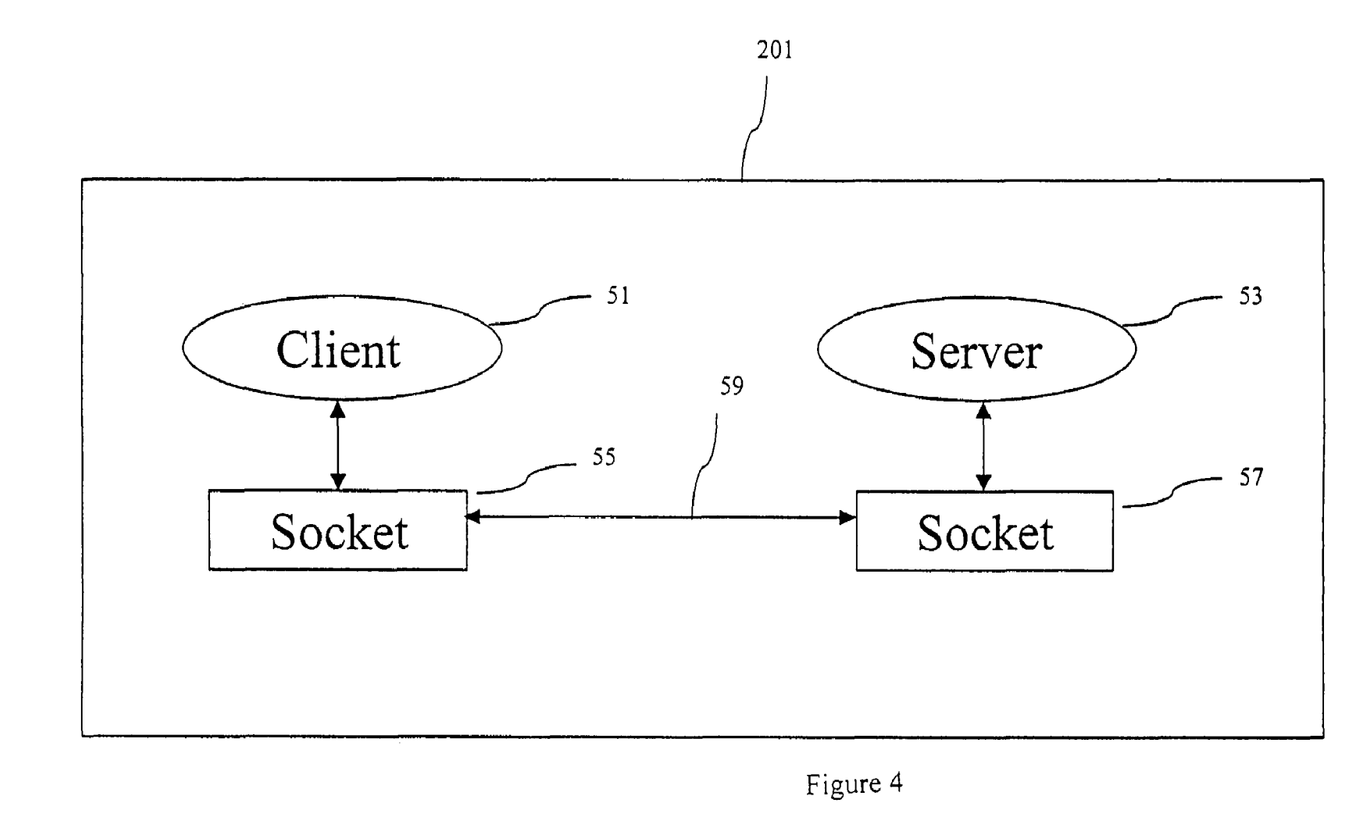
FIG. 4 is an overview diagram of conventional direct connection socket, such as UNIX-domain sockets, that do not use connection oriented protocol and may only be used on the same system.

An alternative conventional connection relationship between client and server that does not use connection oriented protocol is depicted in FIG. 4. An example of the configuration depicted in FIG. 4 is the UNIX-domain sockets. A client 51 associated with a socket 55 is on the same system 43 as a server 53 associated with a socket 57. Pointers 59 are set between the sockets 55 & 57. Data may be written to a socket 55 or 57 and transferred or copied to the corresponding socket 57 or 55 via the pointers 59. Although connection oriented protocol is not used in this connection relationship and therefore local data transfer is more efficient than in data transfers using connection oriented protocol, the configuration depicted in FIG. 4 may only be used for clients and servers that are within the same system 43. Furthermore, the clients must be individually configured for transferring data directly between the client socket and the server socket, and as a practical matter, most software is written to form socket connections using connection oriented protocol as depicted in FIGS. 1 & 2.

Figure 5:
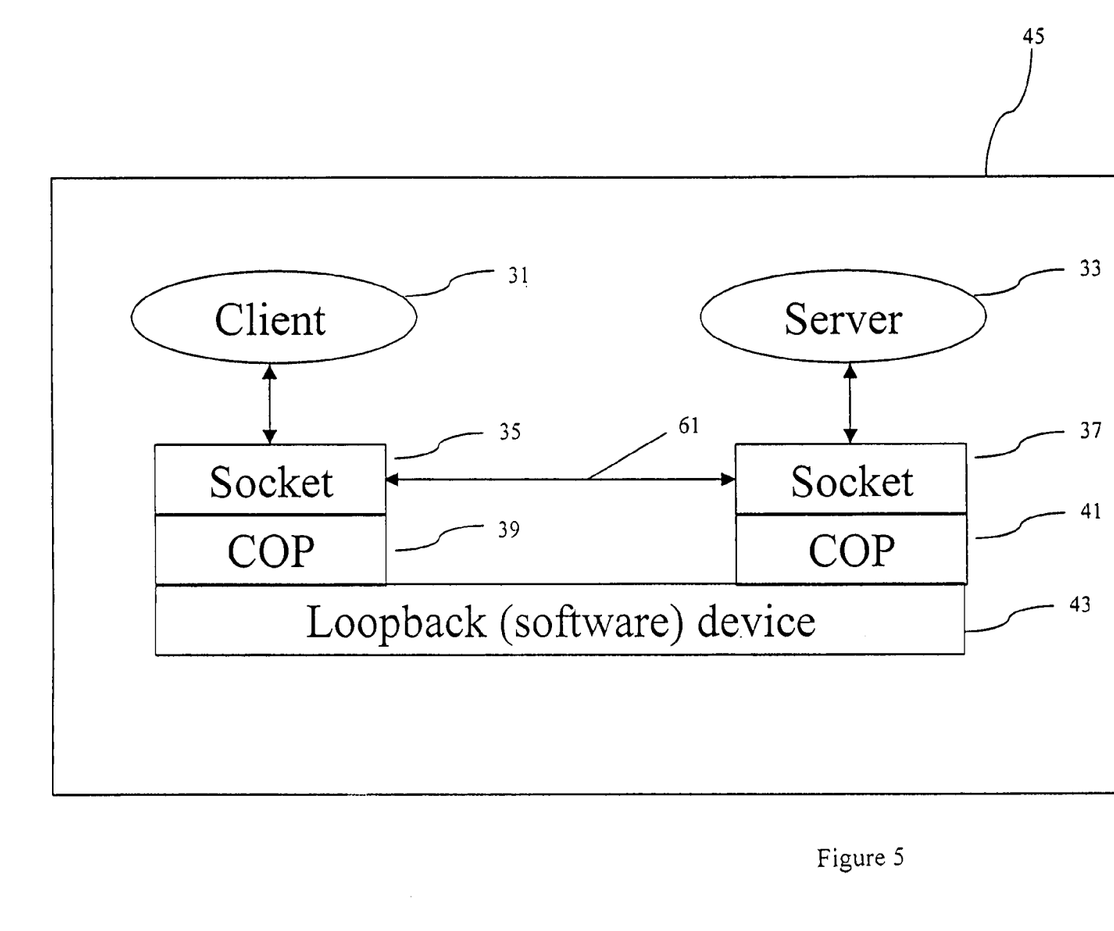
FIG. 5 is an overview diagram of the method and system described herein where the client and server are on a single system, and pointers are set to the client and server sockets bypassing connection oriented protocol.

FIG. 5 depicts an overview diagram of the system and method where the client and server are on a single system, and pointers are set to the client and server sockets, bypassing the connection oriented protocol associated with the sockets. A conventional connection using connection oriented protocol 39 & 41 and a loopback software device 43 is established between the client socket 35 and the server socket 37. However, additional pointers are set such the data is not transferred via the connection oriented protocol 39 & 41 or the loopback software device 43. Instead, the data is transferred via pointers set directly between the client socket 35 and the server socket 37.

If the server 33 and the client 31 determine that the client 31 and the server 33 are located on the same system 45, the server 33 sets pointers 61 such that data may be transferred directly between client socket 35 and server socket 37. If the client 31 and the server 33 are not located on the same system 45, the pointers 61 will be set to null, leaving the conventional connection configuration as illustrated in FIG. 1. Thus, the invention supports both local and remote connections.

Preferably, the system and method detects whether the client and server sockets 35 & 37 are compatible types. In order for accurate data transfer between the sockets 35 I& 37 via the pointers 61, the sockets 35 & 37 must be compatible, or of the same type. As will be appreciated by one of ordinary skill in the art, although the invention is described as implemented with the sockets 35 & 37 it may also be implemented with other comparable Interprocess Communications Facilities such as stream sockets, datagram sockets, Berkeley Standard Distribution (BSD) sockets, UNIX-domain sockets, or Transport Layer Interface (TLI) connections. Different kinds of Interprocess Communications Facilities may not be compatible for direct data transfer. Thus, if the sockets 35 & 37 are not compatible, it is necessary to set the pointers 61 to null such that a conventional connection oriented protocol connection remains as shown in FIG. 3.

More preferably, the system and method provides for error detection in connection such that when an error is detected, the pointers 61 between the sockets are set to null. This aspect of the invention allows for a return to conventional data transfer using connection oriented protocol if error occur.

Figure 6:
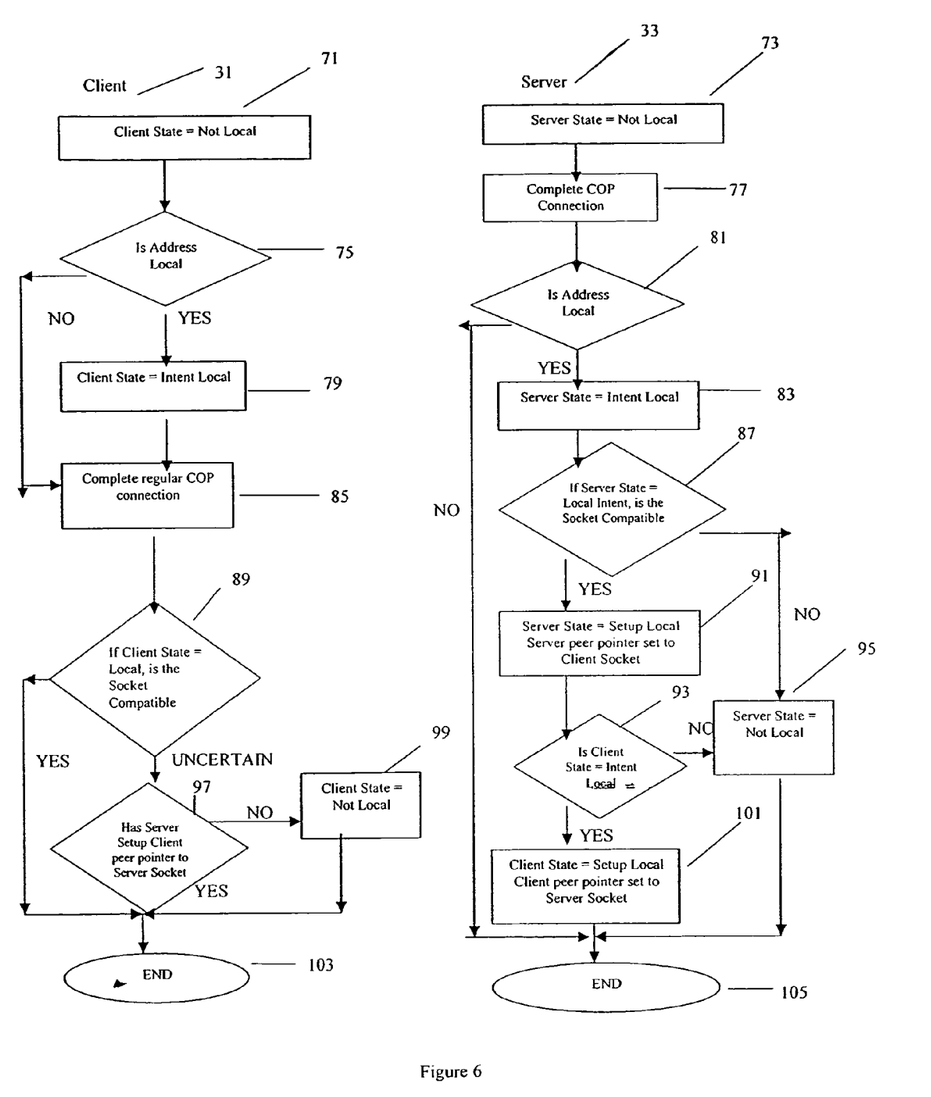
FIG. 6 shows the flow of how the connection and pointers are set between the client and the server.

More preferably, the system and method uses a process shown in FIG. 6 to determine whether a client 31 and a server 33 are located on the same system 45. Both the client 31 and the server 33 have a respective state variable that prior to connection is set to "not local" 71 & 73. The "not local" state indicates that the pointers 61 should be set to null, allowing a conventional connection oriented protocol connection as shown in FIG. 3. Therefore, the connection process depicted in FIG. 6 will not set the pointers 61 to form a direct socket connection absent certain conditions, which are discussed in detail below.

As shown in FIG. 6, the client queries whether its address is local to the server 33 with which it is attempting to establish a connection. If the client is local, the client state variable is changed to "intent local" 79. The intent local state indicates that the address of the server is local to the address of the client, and therefore, it may be appropriate to set pointers 61 directly to the client and server sockets 35 & 37. However, as will be described in detail below, additional checks for compatibility are necessary to ensure successful data transfer. If the address of the server is not local to the address of the client, then the client state remains "not local" 71.

The conventional connection oriented protocol connection is completed between the server and the client 77 & 85. The server then queries whether the client address is local to the server 81. If the client address is not local, then the server ends the inquiry 105, and data is transferred via a conventional connection oriented protocol connection as shown in FIG. 1. If the client address is local to the server, the server state variable is changed to "intent local" 83.

Preferably, the client 31 and the server 33 synchronize the client and server sockets 35 & 37 by checking whether the sockets 35 & 37 are compatible 87 & 89. As will be appreciated by one of ordinary skill in the art, sockets or other comparable Interprocess Communications Facilities of different types will not allow direct data transfer through the socket connection configuration illustrated in FIG. 4. Therefore, if the sockets 35 & 37 are local, but not compatible, a conventional socket connection must be used to ensure successful data transfer. Notwithstanding that the client and server may be local, if the server detects that the sockets are not compatible, the server state is set to "not local," 95, which indicates that the pointers 61 should be set to null. Thus, a conventional connection as shown in FIG. 1 remains and data transfer proceeds through a conventional connection oriented protocol connection. Alternatively, if the client detects that the sockets may not be compatible 89, the client queries whether the server has set the client peer pointer to the server socket. If the client determines that the server has not set the client peer pointer to the server socket, the client state is changed to "not local" 99, which indicates that the pointers 61 should be set to null. If the client state or the server state is changed to "not local" 95 & 99, then the conventional connection as shown in FIG. 1 remains and data transfer proceeds through a conventional connection oriented protocol connection.

However, if the sockets are compatible, the server sets up a pointer to the client 91. Preferably, the synchronization between the client and server sockets 35 & 37 includes a final verification step in which the server queries whether the client state has been set to "intent local" 93 and the client queries whether the server has set a pointer to the client 97. If the client state is not "intent local" 93, then the pointer to the client is set to null and the server state is changed to "not local." If the server has not set up a pointer to the client 97, then the client state is changed to "not local" 99. Thus, if the client state is not "intent local" 93 or the server has not set up a pointer 97, then a conventional connection as shown in FIG. 1 remains and data transfer proceeds through the conventional connection oriented protocol connection.

Alternatively, if the client state has been set to "intent local" 93, then the server sets the client pointer to the server 101 and ends the connection process 105. If the client detects that the server has set up the client's peer pointer to the server socket 97, then the client also ends the connection process 103. Thus, the server has set up a pointer from the server to the client 91 and from the client to the server 101. The server also sets the client state to "setup local" 101. These pointers 61 are depicted jointly in FIG. 4.

Figure 7:
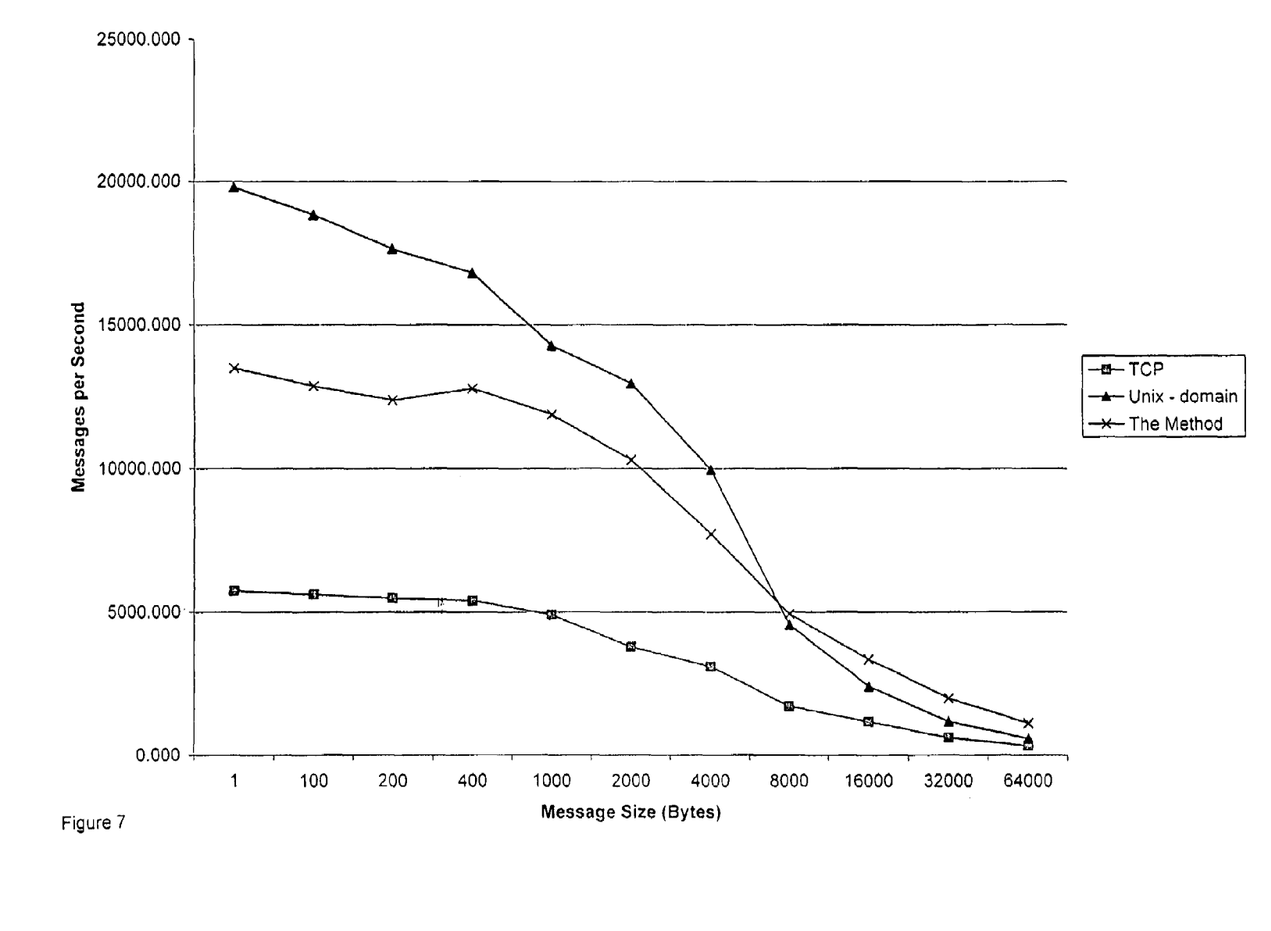
FIG. 7 is a graph showing the performance benefits that may be obtained using the system and method by comparing the data transfer rates of a conventional TCP/IP and Unix-domain connections with the system and method. The graph shows throughput in messages per second for message sizes in bytes.

FIG. 7 shows the performance benefits that may be obtained using the system and method by comparing the data transfer rates of a conventional TCP and Unix-domain connections with the system and method. The graph shows throughput in messages per second for message sizes in bytes. As is readily ascertainable from FIG. 7, the system and method provides a higher throughput than a conventional TCP connection. The throughput using the system and method is generally lower than a conventional Unix-domain connection, however, a Unix-domain connection may only be used only for local connections and applications individually coded to accept a Unix-domain connection. Thus, the system and method provides higher throughput when compared to a conventional TCP connection, and support both local and remote connections. In addition, applications previously coded to use a conventional TCP connection are supported, and therefore, recoding is generally not necessary.

It will be appreciated from the above discussion that the invention may be implemented in other specific forms without departing from the spirit or essential characteristics thereof. The scope of the invention is indicated by the appended claims rather than by the foregoing description and all changes within the meaning and range of equivalency of the claims are intended to be embraced therein.

The invention claimed is:

1. A method of interprocess communications between a client and a server, each client and server having one or more Interprocess Communications Facilities which are sockets, and wherein each Interprocess Communications Facility has connection oriented protocol (COP) associated therewith, comprising:

initiating a query by the server to determine if said client is on the same system as said server;

if said query indicates the client is on the same system as the server as a local client, setting pointers to establish an Interprocess Communications Facility connection between said server and said client, with said Interprocess Communication Facility being a Transport Layer Interface (TLI), to bypass said connection oriented protocol; and transferring data directly between said client and said server within the same connection as the connection-oriented protocol in a manner bypassing said connection oriented protocol, and said transferring of data further comprising detecting any errors in said data transferring step, and if errors are detected, setting pointers to null, and transferring the data through the connection oriented protocol.

2. The method of claim 1, further comprising the step of disconnecting said Interprocess Communications Facility connection between said client socket and server socket by setting pointers to null.

3. The method of claim 1, wherein said connection oriented protocol is Transmission Control Protocol/Internet Protocol (TCP/IP).

4. The method of claim 1, further comprising:

determining if said server Interprocess Communications Facility and said client Interprocess Communications Facility within the same system are compatible; and if said server Interprocess Communications Facility and said client Interprocess Communications Facility within the same facility are not compatible, transferring data between said client and said server via a conventional connection oriented protocol connection.

5. The method of claim 1, further comprising:

verifying that said client and said server are prepared to set said pointers directly between said client and said server Interprocess Communications Facilities prior to setting said pointers; and when either said client or said server are not prepared to set said pointers directly between said client and said server Interprocess Communications Facilities, setting said pointers to null;

transferring data between said client and said server via a conventional connection oriented protocol connection.

6. A system of interprocess communications between a client and a server, comprising:

a server having server data and a server Interprocess Communications Facility which is a socket, associated therewith, said server being configured for communicating with one or more clients having client data and a client Interprocess Communications Facility which is a socket, associated therewith;

said server Interprocess Communications Facility and said client Interprocess Communications Facility being configured for forming a connection between said server Interprocess Communications Facility and said client Interprocess Communications Facility for delivering said server data and receiving said client data, and wherein said Interprocess Communications Facility is a Transport Layer Interface (TLI);

said connection having connection oriented protocol operatively associated therewith;

said server being programmed for initiating a query to detect if said client is on the same system as the server as a local client or on a system which is different on which it is remote;

said client being configured for detecting if said server is on the same system as the client which is local or on a system which is different in which the server is remote;

said server being further configured to setting pointers to said client Interprocess Communications Facility if said client is local;

said pointers being configured to form a direct connection between said server Interprocess Communications Facility and said client Interprocess Communications Facility for data exchange between said client and said server within the same connection as the connection oriented protocol in a manner for bypassing said connection oriented protocol;

said server is further configured for detecting errors in data transfer, setting said pointers to null if errors are detected, and setting a conventional Interprocess Communications Facility connection using the connection oriented protocol; and said server is further configured to determine if said server and said client Interprocess Communications Facilities within the same system are compatible, and if said server and said client Interprocess Communications Facilities are not compatible, transferring data between said client and said server through the conventional connection oriented protocol connection.

7. The system of claim 6, said server and said client being further configured for setting said pointers to null.

8. The system of claim 6, wherein said server is further configured for detecting errors in connection; setting pointers to null if error are detected; and transferring data between said client and said server through the conventional connection oriented protocol connection.

9. The system of claim 6, wherein said server is further configured to verify that said client is prepared to transmit data via said pointers set directly between said client and said server Interprocess Communications Facilities.

10. The system of claim 9, wherein said client is further configured to verify that said server is prepared to transmit data via said pointers set directly between said client and said Interprocess Communications Facilities.

* * * * *